United States Patent [19]

Koster et al.

[11] 3,987,645

[45] Oct. 26, 1976

[54] FLEXIBLE SHAFT COUPLING

[75] Inventors: Marinus Pieter Koster; Johannes Anthonius Maria Spapens, both of Eindhoven, Netherlands

[73] Assignee: U.S. Philips Corporation, New York, N.Y.

[22] Filed: Jan. 7, 1975

[21] Appl. No.: 539,116

[30] Foreign Application Priority Data

Jan. 23, 1974   Netherlands.................... 7400886

[52] U.S. Cl. .................................. 64/15 B; 64/13
[51] Int. Cl.² ........................................... F16D 3/52
[58] Field of Search ............ 64/15 B, 15 R, 12, 13, 64/27 R

[56] References Cited
UNITED STATES PATENTS

| 2,475,010 | 7/1949 | Chilton | 64/15 B |
| 2,627,733 | 2/1953 | Amberg | 64/15 B |
| 2,984,996 | 5/1961 | Ormond | 64/15 B |
| 3,548,613 | 12/1970 | Mounteer | 64/15 B |

Primary Examiner—Samuel Scott
Assistant Examiner—Randall Heald
Attorney, Agent, or Firm—Frank R. Trifari; David R. Treacy

[57] ABSTRACT

A flexible shaft coupling consisting of a rigid plate, and shaft connection segments connected to the plate by elongated resilient tongues. The coupling is formed by cut-outs from a solid plate. Besides angle errors of the shafts to be coupled, this shaft coupling also takes up eccentricity errors and displacement in the axial direction, and forms a play-free homokinetic connection between two shafts. A comparatively high torsional rigidity of the shaft coupling is ensured.

5 Claims, 1 Drawing Figure

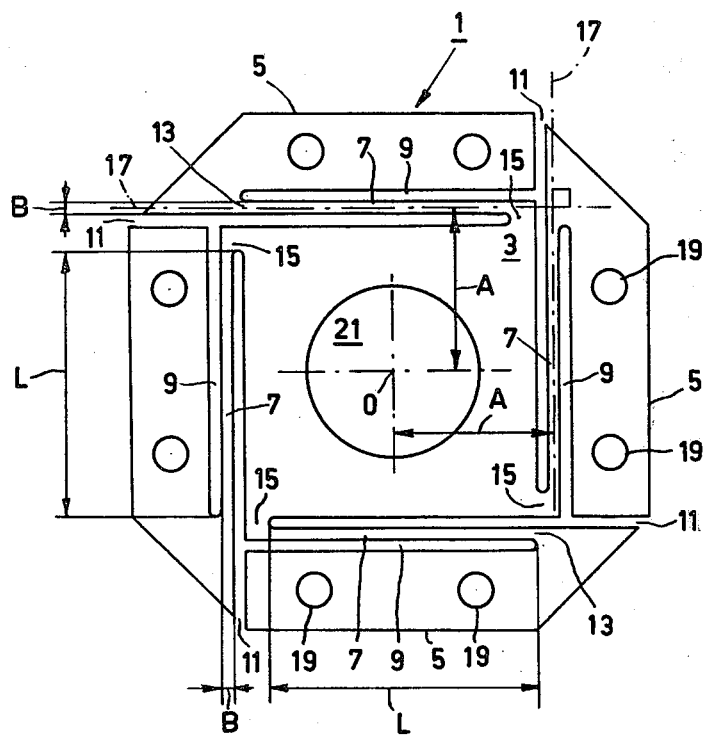

FLEXIBLE SHAFT COUPLING

The invention relates to a flexible shaft coupling consisting of an elastically deformable coupling member which can be connected to a driving shaft on the one side and to a driven shaft on the other side.

A shaft coupling of this kind is known from British patent specification No. 923,494. In this known coupling alignment errors in the sense of the angle of the shafts are permissible. However, alignment errors in the sense of the eccentricity of the shafts cannot be taken up.

It is the object of the invention to provide a flexible shaft coupling which without play takes up alignment errors in the sense of the angle of the shafts as well as alignment errors in the sense of the eccentricity of the shafts, angular conformity then being maintained. Angular conformity is to be understood to mean herein that the entrance angle of the driving shaft and the exit angle of the driven shaft are equal at any given instant.

This object is achieved according to the invention mainly in that the coupling member comprises a rigid plate which is provided with elongated elastic tongues, diametrically opposed tongues being pair-wise connected at their ends to the driving shaft and the driven shaft.

A shaft coupling is thus obtained which transfers rotation about the center line of the shafts with angular conformity and without play; alignment errors in the sense of eccentricity of the shafts as well as in the sense of the angle of the shafts and relative displacements of the shafts in the axial direction can be taken up; in addition, the shaft coupling according to the invention has a comparatively high torsional rigidity, while the rigidities in the sense of the eccentricity of the shafts, angle of the shafts and relative axial displacements of the shafts are comparatively low. It is to be noted that flexible shaft couplings taking up alignment errors in the sense of the angle of the shafts as well as in the sense of eccentricity of the shafts are known per se; however, these known shaft couplings do not transfer the rotary movement without play, or do not offer angular conformity, or have a low torsional rigidity, or have comparatively large dimensions, or are composed of a plurality of components.

In a preferred embodiment of the flexible shaft coupling according to the invention the coupling member is provided with segments which succeed each other in the circumferential direction, each segment being connected to the plate by an elongated tongue. By connection of alternate segments to the driving shaft and the driven shaft, respectively, the coupling of the coupling member to the driving shaft and the driving shaft can be simply effected without affecting the elasticity of the tongue.

In another preferred embodiment of the flexible shaft coupling according to the invention, the coupling member, formed by the segments, the tongues and the rigid plate, is made as one integral unit. The described advantageous properties can thus be combined with very small axial dimensions of the shaft coupling.

In a further preferred embodiment of the flexible shaft coupling according to the invention, the coupling member comprises four elongated tongues whose axes are perpendicular to each other. It is thus achieved that the energy amassed in the tongues in the form of elastic deformation due to eccentricity of the shafts is constant, and hence independent of the angle completed about the center line of the shafts.

A final preferred embodiment of the flexible shaft coupling according to the invention is characterized in that the coupling member is made of a material having an ultimate reversed stress of at least 250 N/mm$^2$. A shaft coupling made of such a material, for example spring steel, has a substantially unlimited service life of at least $n = 10^8$ revolutions if a given load due to the torque to be transmitted, and/or eccentricity of the shafts, and/or angle of the shafts and/or relative axial displacement of the shafts is not exceeded.

The invention will be described in detail hereinafter with reference to the drawing, whose sole FIGURE is an end view of a unitary plate coupling according to the invention.

The flexible coupling shown in the drawing consists of a coupling member 1 which is made of hardened spring steel, comprising a rigid central plate 3, four segments 5 which succeed each other in the circumferential direction, and four elastically deformable elongated tongues 7. Each segment 5 is connected to the plate 3 by one of the tongues 7. Each tongue 7 is bounded by two parallel cut-outs 9 and 11 and is connected at one end to the associated segment 5 by a bridge portion 13 and at the other end to the plate 3 by a bridge portion 15.

Each segment 5 is provided with at least one opening 19 (two openings 19 in the embodiment shown). Via these openings, two diametrically opposed segments are connected to a driving shaft; the other two segments are connected to the driven shaft. The plate can be provided with a boring 21 to reduce the mass of the coupling member.

The reference A denotes the distance between the center line 0 of the plate 3 and the center lines 17 of the tongues 7; the reference B denotes the width, while the reference L denotes the length of the tongues.

An embodiment of the flexible shaft coupling according to the invention which was tested in practice was proportioned as follows:

| | |
|---|---|
| thickness of the coupling member | 2 mm |
| distance A | 39 mm |
| width B of the tongues | 1.45 mm |
| length L of the tongues | 60 mm | material: hardened spring steel having a modulus of elasticity $E = 2.18 - 2.28 \times 10^4$ kgf/mm$^2$.

Using such a shaft coupling, a torque of nominally 30 Nm was transmitted at a nominal eccentricity of the shafts of 0.5 mm; the service life was then found to be in excess of $10^8$ revolutions.

For a torque to be transmitted of 30 Nm while maintaining the same service life, the use of such a shaft can also permit a maximum angle error of the shafts of nominally 0.02 rad, or a maximum relative axial displacement of the shafts of nominally 0.7 mm.

For a given torque to be transmitted, combinations of alignment errors in the sense of the eccentricity of the shafts, of alignment errors in the sense of the angle of the shafts and of relative axial displacements of the shafts can be tolerated in so far as the resultant total load of the shaft coupling does not exceed a given value. The loadability and the torsional reigidity of the shaft coupling are determined by the dimensions of the tongues 7 and by the distance A between the center line 0 of the plate 3 and the center line 17 of the tongues.

The circumferential profile of the coupling member is of secondary importance and can be adapted to the shape and the dimensions of the shafts to be coupled.

The cut-outs which bound the tongues need not extend in parallel; the cut-outs may also be such that tongues having a cross-section which varies over their length are formed. The shaft coupling according to the invention is suitable for both directions of rotation.

What is claimed is:

1. A flexible shaft coupling comprising an elastically deformable coupling member which can be connected between a driving shaft and a driven shaft for rotation about a coupling axis, wherein the coupling member comprises a rigid plate, two pairs of diametrically opposed elastic elongated tongues, each tongue having a longitudinal axis transverse to said coupling axis and having one end connected to the rigid plate and having another end longitudinally separated from said one end, said other ends of one pair being connected to the driving shaft and said other ends of the other pair being connected to the driven shaft.

2. A flexible shaft coupling as claimed in claim 1, wherein the coupling member further comprises shaft connection segments which succeed each other in the circumferential direction, each segment being connected to the plate by one of the tongues.

3. A flexible shaft coupling as claimed in claim 2, wherein the coupling member formed by the segments, the tongues and the rigid plate is made as one integral unit.

4. A flexible shaft coupling as claimed in claim 3, wherein the coupling member is made of a material having an ultimate reversed stress of at least 250N/mm$^2$.

5. A flexible shaft coupling as claimed in claim 1, wherein the axes of one pair of said tongues are perpendicular to the axes of the other pair.

* * * * *